C. FLORY.
Cultivator.
No 69,981.
Patented Oct. 22, 1867.
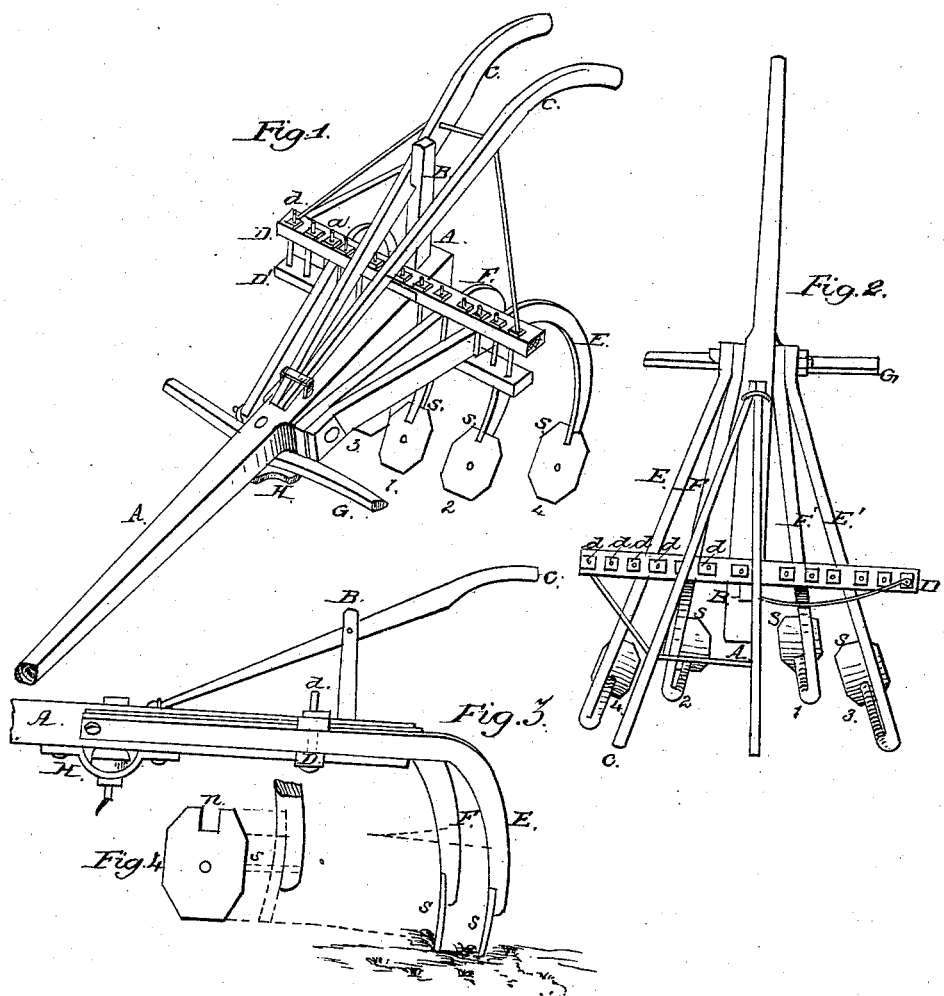
WITNESSES:
Geo. Sanderson
Jacob Stauffer
INVENTOR:
Christian Flory

United States Patent Office.

CHRISTIAN FLORY, OF EAST DONEGAL, PENNSYLVANIA.

Letters Patent No. 69,981, dated October 22, 1867.

IMPROVEMENT IN CORN-CULTIVATORS.

*The Schedule referred to in these Letters Patent and making part of the same.*

TO ALL WHOM IT MAY CONCERN:

Be it known that I, CHRISTIAN FLORY, of East Donegal, in the county of Lancaster, and State of Pennsylvania, have invented a new and useful combination on a Cultivator for Dressing or Finishing Corn; and I do hereby declare that the following is a full, clear, and exact description of the construction and operation of the same, reference being had to the accompanying drawings, making a part of this specification, in which—

Figure 1 is a perspective view.

Figure 2, a bird's-eye or plan view.

Figure 3, a profile or side view.

Figure 4 shows the notched and straight-edged shovel and mode of attachment.

The object of this invention is to provide a cultivator which is specially adapted to dressing or finishing up corn, by furnishing it with shovels, firmly set, and having a straight-cutting edge instead of the ordinary pointed shovels, which penetrate the mellowed soil too deeply, and are not so well adapted for scraping the soil up and cutting off weeds.

To enable others skilled in the art to make and use my invention I will describe its construction and operation.

The pole A, bearing a single upright, B, for the handles C, is of wood, and forms the central piece. On each side there is a pair of iron shovel-arms, E F, bolted together in front through the sides of the pole or centre-beam A, and slightly bent outwards and passed through between a pair of straight iron brace-bars, D D, which are at right angles with the pole. These cross-bars D D' are provided with a series of headed bolts, d, and screw ends for a nut, between which bolts d the shovel-arms E F E' F' are made adjustable and firmly held. The two outer shovel-arms E E' are somewhat longer than the inner pair F F', all curved down, with a portion cut out from the inner edge the thickness of the shovels s, as shown by fig. 4. The shovels s have a square oblong notch, n, cut out so as to fit up on the sides and against the shoulder of the curved beams E F, and fastened by a rivet or bolt through the centre of the shovel, formed, as shown by fig. 4. This mode of attaching the shovels gives them a firm, unyielding hold, so that they cannot turn or move upon the pivot or bolt that holds them. These shovels are also set slightly oblique, so as to draw inwards towards the corn on both sides of the row. The double-tree G is also placed under the pole A, held by a bracket, H.

I am aware that the apparent trifling change in the shape of the shovel and arrangement of the shovel-arms and manner of insertion, may seem to lack novelty, considering the multitude of patents on cultivators. I am also aware that straight and curved bars for adjustment are in use, curved iron beams, hinged or bolted together in separate and divers combinations. I therefore do not claim any one feature separately considered, my object being to combine the most approved arrangement for the purpose of dressing and finishing corn, for which I have found, by experience, that this is peculiarly adapted and highly desirable on the farm.

What I claim as my invention, and desire to secure by Letters Patent, is—

The specified arrangement of the pole A, shovel-beams E F', straight cross-bars D D', with the screw-bolts d, notched and terminal straight-edged shovels s, all constructed and combined in the manner and for the purpose specified and shown.

CHRISTIAN FLORY.

Witnesses:
GEO. SANDERSON,
JACOB STAUFFER.